(12) United States Patent
Chen et al.

(10) Patent No.: US 9,540,716 B2
(45) Date of Patent: Jan. 10, 2017

(54) COMPOSITE POWDER OF CARBIDE/BLENDING METAL

(71) Applicant: INDUSTRIAL TECHNOLOGY RESEARCH INSTITUTE, Hsinchu (TW)

(72) Inventors: Chi-San Chen, Kaohsiung (TW); Chih-Chao Yang, Tainan (TW); Lik-Hang Chau, Tainan (TW); Ching-Chang Hsieh, Tainan (TW); Yen-Yu Hou, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 121 days.

(21) Appl. No.: 14/592,658

(22) Filed: Jan. 8, 2015

(65) Prior Publication Data
US 2016/0115572 A1  Apr. 28, 2016

(30) Foreign Application Priority Data
Oct. 28, 2014  (TW) .............................. 103137199 A

(51) Int. Cl.
| | |
|---|---|
| *C22C 29/06* | (2006.01) |
| *C22C 29/08* | (2006.01) |
| *C22C 29/10* | (2006.01) |
| *C22C 49/11* | (2006.01) |
| *B22F 3/105* | (2006.01) |
| *C22C 49/06* | (2006.01) |
| *C22C 49/08* | (2006.01) |
| *C22C 49/02* | (2006.01) |
| *C22C 49/14* | (2006.01) |
| *B33Y 70/00* | (2015.01) |

(52) U.S. Cl.
CPC ............. *C22C 29/08* (2013.01); *B22F 3/1055* (2013.01); *C22C 29/06* (2013.01); *C22C 29/067* (2013.01); *C22C 29/10* (2013.01); *C22C 49/11* (2013.01); *B33Y 70/00* (2014.12); *C22C 49/02* (2013.01); *C22C 49/06* (2013.01); *C22C 49/08* (2013.01); *C22C 49/14* (2013.01)

(58) Field of Classification Search
CPC ...................................................... C22C 29/005
USPC ...................................................... 75/252, 240
See application file for complete search history.

(56) References Cited

U.S. PATENT DOCUMENTS

| | | | | |
|---|---|---|---|---|
| 5,102,452 A | * | 4/1992 | Taskinen | C22C 29/08 419/18 |
| 5,281,260 A | * | 1/1994 | Kumar | E21B 10/52 175/426 |
| 7,713,468 B2 | * | 5/2010 | Persson | B22F 1/0003 419/32 |

FOREIGN PATENT DOCUMENTS

| | | |
|---|---|---|
| CN | 102492886 A | 6/2012 |
| TW | 200914628 A | 4/2009 |

OTHER PUBLICATIONS

Zhang et al., "The effect of phosphorus additions on densification, grain growth and properties of nanocrystalline WC—Co composites", Elsevier, Journal of Alloys and Compounds, 2004, vol. 385, pp. 96-103.

* cited by examiner

*Primary Examiner* — Jessee Roe
*Assistant Examiner* — Ngoclan T Mai
(74) *Attorney, Agent, or Firm* — Birch, Stewart, Kolasch & Birch, LLP

(57) ABSTRACT

A composite powder is provided. The composite powder comprises 80-97 wt % of carbide and 3-20 wt % of blending metal powder comprising cobalt and a first metal powder, wherein the first metal powder is formed of one of aluminum, titanium, iron, nickel, or a combination thereof, and the amount of cobalt is 90-99% of total blending metal powder.

14 Claims, 5 Drawing Sheets

COMPOSITE POWDER OF CARBIDE/BLENDING METAL

This application claims the benefit of Taiwan application Serial No. 103137199, filed Oct. 28, 2014, the disclosure of which is incorporated by reference herein in its entirety.

TECHNICAL FIELD

The disclosure relates in general to a composite powder of carbide/blending metal, and more particularly to a composite powder of which the blending metal mainly composed of cobalt.

BACKGROUND

Knives, molds, and workpieces are essential tools for mass production, and product upgrade in the industries, such as electronics, communication, optoelectronics, precision machinery and transport, all relies on the elevation in the technological capacity of the industries of knives, molds, and workpieces. Also, facing the competition pressure of globalization and rapid change of the environment, the industries of knives and molds are crucial to promote industrial upgrade and are very important to industrial development.

However, the hardness, abrasion resistance and temperature resistance of knives, molds, and workpieces directly affect the lifespan of molds and accordingly affect the quality and function of back-end products, and the manufacturing process, materials and cost of knives, molds, and workpieces further affect product competiveness. Therefore, how to improve the hardness, abrasion resistance, temperature resistance of knives, molds and parts and the processing and manufacturing process for workpieces with complicated shapes have become prominent tasks for the industries.

SUMMARY

The disclosure is directed to a composite powder of carbide/blending metal.

According to one embodiment, a composite powder is provided. The composite powder comprises 80-97 wt % of carbide and 3-20 wt % of a blending metal powder comprising cobalt and a first metal powder, wherein the first metal powder is formed of one of aluminum, titanium, iron, nickel or a combination thereof, and the amount of cobalt occupies 90-99% of the total blending metal powder.

According to another embodiment, an additive laser sintering is provided. The additive laser sintering comprises following steps: a composite powder comprising 80-97 wt % of carbide and 3-20 wt % of a blending metal powder is provided. The blending metal powder comprises cobalt and a first metal powder, wherein the first metal powder is formed of one of aluminum, titanium, iron, nickel or a combination thereof, and the amount of cobalt occupies 90-99% of the total blending metal powder. A laser sintering process is performed on the composite powder to form a workpiece. In an embodiment of the present disclosure, carbide knives, molds, and workpieces are formed by the additive laser sintering process. By using the additive laser sintering technique, conventional two-stage processes (that is, the sintering process and the removing process) can be reduced to one-stage additive sintering process, the sintered body can be near net-shaped, material usage can be reduced, and the process problems of processing workpieces with complicated shapes can be resolved.

The above and other aspects of the invention will become better understood with regard to the following detailed description of the preferred but non-limiting embodiment(s). The following description is made with reference to the accompanying drawings.

Figure 1:
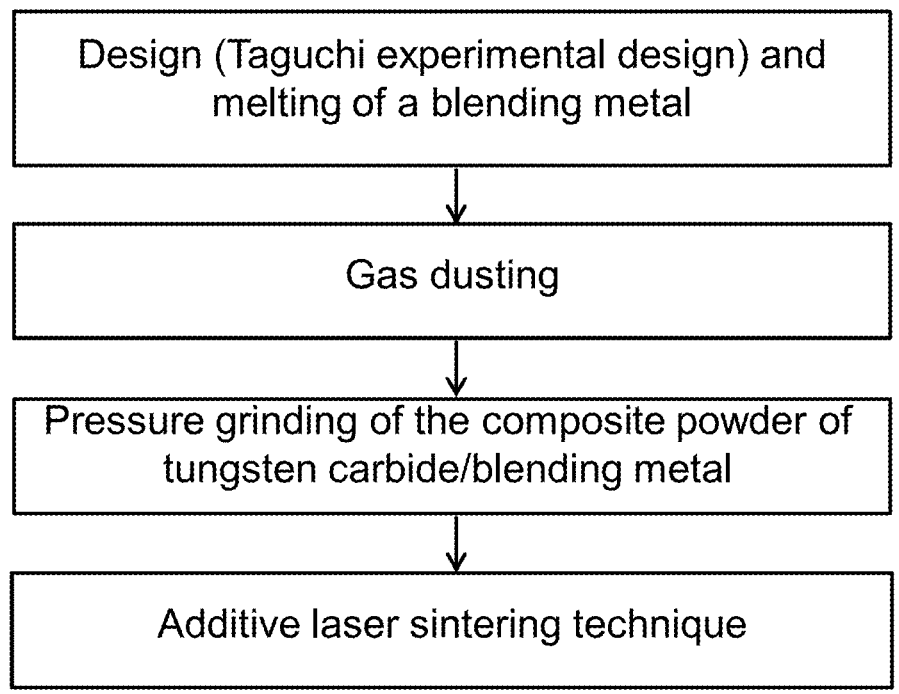
FIG. 1 is a flowchart of manufacturing a composite powder according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In an embodiment of the present disclosure, the composite powder does not contain any inhibitor or graphite, has small particle sizes of such as <1 μm, small contact angle of such as between 42°-20° in the solid-liquid phase, and high wettability and circularity which are advantageous to the processing of workpieces such as those with complicated shapes. The workpieces formed by the sintering process are more compact with fewer pores, reduce the usage of material, and are widely used in the manufacturing of knives, molds, and workpieces. A number of embodiments of the present disclosure are disclosed below with accompanying drawings. Detailed structures and procedures disclosed in the embodiments of the present disclosure are for explanatory and exemplary purposes only, not for limiting the scope of protection of the present disclosure. Anyone who is skilled in the technology field of the disclosure can make necessary modifications or variations to the structures according to the needs in actual implementations.

According to an embodiment of the present disclosure, a composite powder is provided.

In an embodiment, a composite powder comprising 80-97 wt % of carbide and 3-20 wt % of blending metal powder is provided. The blending metal powder comprises cobalt and a first metal powder, wherein the first metal powder is formed of one of aluminum, titanium, iron, nickel, or a combination thereof, and the amount of cobalt occupies 90-99% of the total blending metal powder. In short, the composite powder is formed from carbide and a blending metal powder, wherein the blending metal is mainly composed of cobalt, and the other ingredient is formed of one of aluminum, titanium, iron, nickel, or a combination thereof.

In an embodiment, the composite powder comprises 80-97 wt % of tungsten carbide and 3-20 wt % of blending metal powder comprising cobalt and a first metal powder, wherein the first metal powder is formed of one of aluminum, titanium, iron, nickel, or a combination thereof, and the amount of cobalt occupies 90-99% of the total blending metal powder.

In an embodiment, cobalt occupies such as 90-100 wt % of the blending metal powder.

In an embodiment, aluminum occupies such as 1-3 wt % of the blending metal powder.

In an embodiment, titanium occupies such as 1-3 wt % of the blending metal powder.

In an embodiment, iron occupies such as 1-3 wt % of the blending metal powder.

In an embodiment, nickel occupies such as 1-3 wt % of the blending metal powder.

The flowchart of the present disclosure as indicated in FIG. 1 comprises design (Taguchi experimental design) and melting of a blending metal, gas dusting, pressure grinding of the composite powder of tungsten carbide/blending metal, and an additive laser sintering technique.

In an embodiment, the blending metal powder and the tungsten carbide powder are grinded with high energy pressure and generate a large amount of cold solder and fragmentation during the pressure grinding process. Furthermore, a mechanical force is generated from the pressure grinding process for blending and refining the powder, such that the blending metal is uniformly distributed on the surface of tungsten carbide to achieve a fully and uniform blending.

The present disclosure is further elaborated with a number of embodiments below.

Properties of the composite powder manufactured according to the present disclosure are disclosed below with a number of embodiments of the compositions of the blending metal and the contact angles formed between the blending metals and tungsten carbide. However, the following embodiments are for explanatory and exemplary purposes only, not for limiting the scope of protection of the present disclosure. The compositions of the blending metals and the contact angles formed between the blending metals and tungsten carbide of the embodiments are illustrated in Table 1. The proportion of each element is represented by the weight percentage (wt %) of the total blending metal powder. The contact angle is measured as follows. Firstly, the blending metal is melted to obtain an alloy bulk by using the vacuum induction melting (VIM) method. Next, a small piece of the alloy bulk is placed on the tungsten carbide plate and is further melted by using the arc instant heating method. Then, the angle between the blending metal material and tungsten carbide plate is measured.

TABLE 1

| | Aluminum (wt %) | Titanium (wt %) | Iron (wt %) | Nickel (wt %) | Cobalt (wt %) | Contact Angle |
|---|---|---|---|---|---|---|
| Embodiment 1 | 0 | 0 | 0 | 0 | 100 | 45° |
| Embodiment 2 | 1 | 1 | 1 | 1 | 96 | 30° |
| Embodiment 3 | 1 | 2 | 2 | 2 | 93 | 21° |
| Embodiment 4 | 1 | 3 | 3 | 3 | 90 | 33° |
| Embodiment 5 | 2 | 1 | 2 | 3 | 92 | 29.5° |
| Embodiment 6 | 2 | 2 | 3 | 1 | 92 | 21° |
| Embodiment 7 | 2 | 3 | 1 | 2 | 92 | 33° |
| Embodiment 8 | 3 | 1 | 3 | 2 | 91 | 41.5° |

Measurement of the contact angle between the blending metal and carbide tungsten.

Embodiment 1

A small piece of cobalt is placed on a tungsten carbide plate; the cobalt piece is melted by using the arc instant heating method; and the angle between and the tungsten carbide plate is measured as 45°.

Embodiment 2

96 wt % of cobalt, 1 wt % of aluminum, 1 wt % of titanium, 1 wt % of iron, and 1 wt % of nickel are melted by using the vacuum induction melting (VIM) method to obtain a blending metal bulk; a small piece of the blending metal bulk is taken and placed on a tungsten carbide plate; the blending metal piece is melted by using the arc instant heating method; and the angle between the blending metal piece and the tungsten carbide plate is measured as 30°.

Embodiment 3

93 wt % of cobalt, 1 wt % of aluminum, 2 wt % of titanium, 2 wt % of iron, and 2 wt % of nickel are melted by using the vacuum induction melting (VIM) method to obtain a blending metal bulk; a small piece of the blending metal bulk is taken and placed on a tungsten carbide plate; the blending metal piece is melted by using the arc instant heating method; and the angle between the blending metal piece and the tungsten carbide plate is measured as 21°.

Embodiment 4

90 wt % of cobalt, 1 wt % of aluminum, 3 wt % of titanium, 3 wt % of iron, and 3 wt % of nickel are melted by using the vacuum induction melting (VIM) method to obtain a blending metal bulk; a small piece of the blending metal bulk is taken and placed on a tungsten carbide plate; the blending metal piece is melted by using the arc instant heating method; and the angle between the blending metal piece and the tungsten carbide plate is measured as 33°.

Embodiment 5

92 wt % of cobalt, 2 wt % of aluminum, 1 wt % of titanium, 2 wt % of iron, and 3 wt % of nickel are melted by using the vacuum induction melting (VIM) method to obtain a blending metal bulk; a small piece of the blending metal bulk is taken and placed on a tungsten carbide plate; the blending metal piece is melted by using the arc instant heating method; and the angle between the blending metal piece and the tungsten carbide plate is measured as 29.5°.

Embodiment 6

92 wt % of cobalt, 2 wt % of aluminum, 2 wt % of titanium, 3 wt % of iron, and 1 wt % of nickel are melted by using the vacuum induction melting (VIM) method to obtain a blending metal bulk; a small piece of the blending metal bulk is taken and placed on a tungsten carbide plate; the blending metal piece is melted by using the arc instant heating method; and the angle between the blending metal piece and the tungsten carbide plate is measured as 21°.

Embodiment 7

92 wt % of cobalt, 2 wt % of aluminum, 3 wt % of titanium, 1 wt % of iron and 2 wt % of nickel are melted by using the vacuum induction melting (VIM) method to obtain a blending metal bulk; a small piece of the blending metal bulk is taken and placed on a tungsten carbide plate; the blending metal piece is melted by using the arc instant heating method; and the angle between the blending metal piece and the tungsten carbide plate is measured as 33°.

Embodiment 8

91 wt % of cobalt, 3 wt % of aluminum, 1 wt % of titanium, 3 wt % of iron, and 2 wt % of nickel are melted by using the vacuum induction melting (VIM) method to obtain a blending metal bulk; a small piece of the blending metal bulk is taken and placed on a tungsten carbide plate; the blending metal piece is melted by using the arc instant heating method; and the angle between the blending metal piece and the tungsten carbide plate is measured as 41.5°.

Implementation of composite powder of carbide tungsten/blending metal.

Embodiment 9

96 wt % of cobalt, 1 wt % of aluminum, 1 wt % of titanium, 1 wt % of iron, and 1 wt % of nickel are melted and dusted to obtain a blending metal powder; 19 wt % of the blending metal powder and 81 wt % of tungsten carbide are pressure grinded to obtain a composite powder of tungsten carbide/blending metal.

Embodiment 10

93 wt % of cobalt, 1 wt % of aluminum, 2 wt % of titanium, 2 wt % of iron, and 2 wt % of nickel are melted and dusted to obtain a blending metal powder; 19 wt % of the blending metal powder and 81 wt % of tungsten carbide are pressure grinded to obtain a composite powder of tungsten carbide/blending metal.

Embodiment 11

90 wt % of cobalt, 1 wt % of aluminum, 3 wt % of titanium, 3 wt % of iron, and 3 wt % of nickel are melted and dusted to obtain a blending metal powder; 19 wt % of the blending metal powder and 81 wt % of tungsten carbide are pressure grinded to obtain a composite powder of tungsten carbide/blending metal.

Embodiment 12

92 wt % of cobalt, 2 wt % of aluminum, 1 wt % of titanium, 2 wt % of iron, and 3 wt % of nickel are melted and dusted to obtain a blending metal powder; 19 wt % of the blending metal powder and 81 wt % of tungsten carbide are pressure grinded to obtain a composite powder of tungsten carbide/blending metal.

Embodiment 13

Figure 2A:
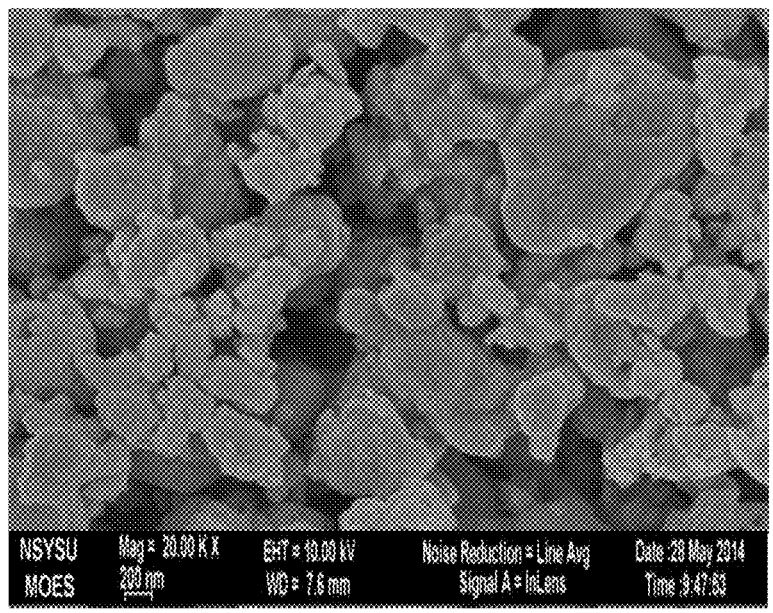
FIGS. 2A and 2B are enlarged views of a composite powder of tungsten carbide/blending metal obtained by using a scanning electron microscope (SEM) according to an embodiment of the present disclosure.
Figure 2B:
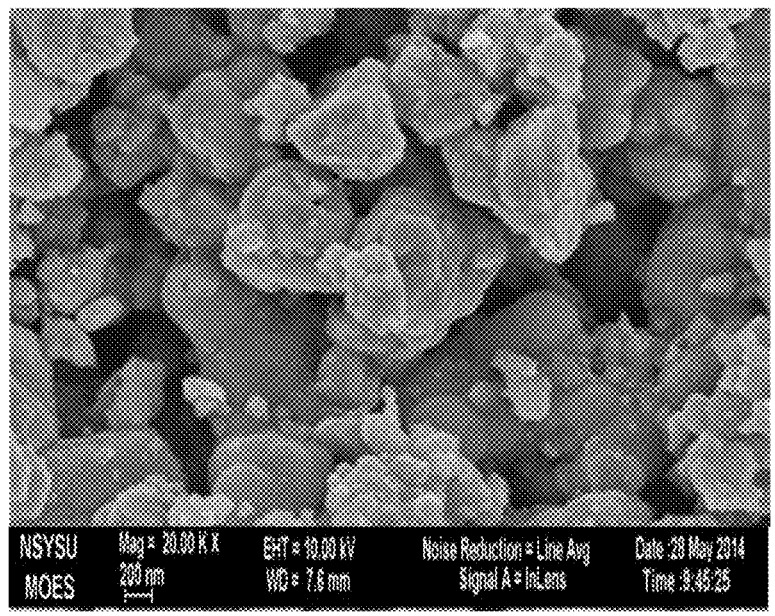

92 wt % of cobalt, 2 wt % of aluminum, 2 wt % of titanium, 3 wt % of iron, and 1 wt % of nickel are melted and dusted to obtain a blending metal powder; 19 wt % of the blending metal powder and 81 wt % of tungsten carbide are pressure grinded to obtain a composite powder of tungsten carbide/blending metal. The particle sizes of the composite powder are measured by using an SEM (JEOL-6330 Field-Emission SEM) (referring to FIG. 2A, 2B), and the measured particle sizes are about 666 nm and 733 nm.

Embodiment 14

92 wt % of cobalt, 2 wt % of aluminum, 3 wt % of titanium, 1 wt % of iron, and 2 wt % of nickel are melted and dusted to obtain a blending metal powder; 19 wt % of the blending metal powder and 81 wt % of tungsten carbide are pressure grinded to obtain a composite powder of tungsten carbide/blending metal.

Embodiment 15

91 wt % of cobalt, 3 wt % of aluminum, 1 wt % of titanium, 3 wt % of iron, and 2 wt % of nickel are melted and dusted to obtain a blending metal powder; 19 wt % of the blending metal powder and 81 wt % of tungsten carbide are pressure grinded to obtain a composite powder of tungsten carbide/blending metal.

Figure 3:
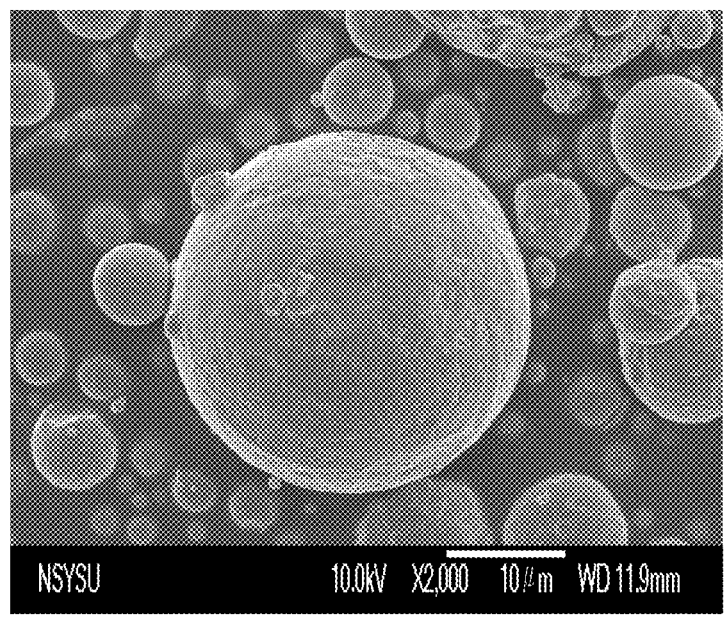
FIG. 3 is an enlarged view of a blending metal powder obtained by using a scanning electron microscope (SEM) according to an embodiment of the present disclosure.
Figure 4A:
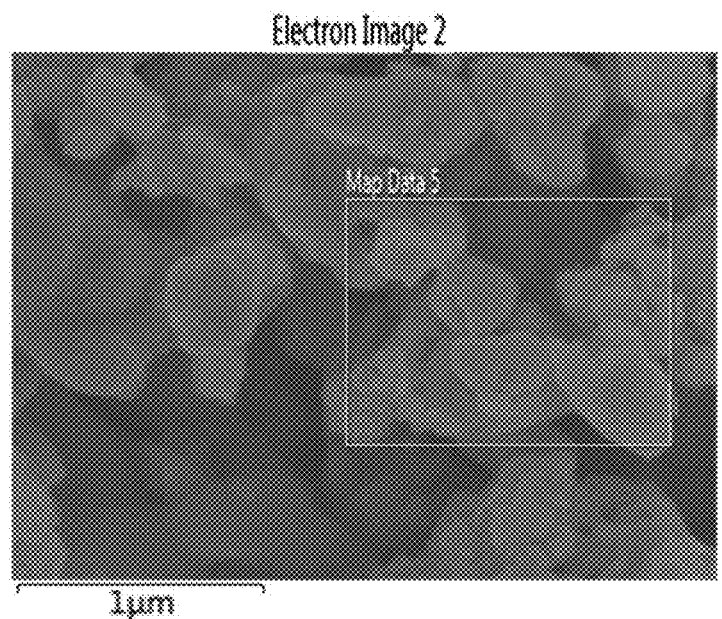
FIGS. 4A-4D are enlarged views of a composite powder of tungsten carbide/blending metal obtained by using an EDS elemental analysis diagram according to the present disclosure embodiment.
Figure 4B:
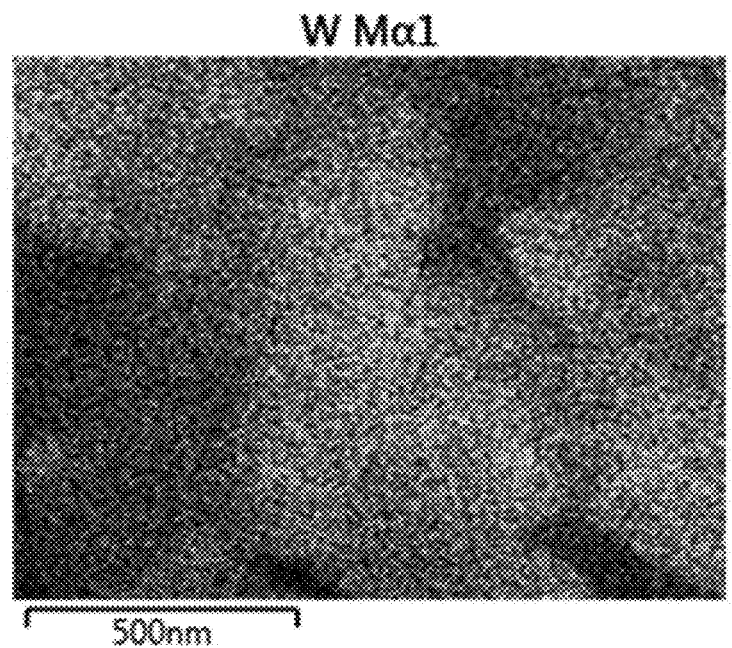
Figure 4C:
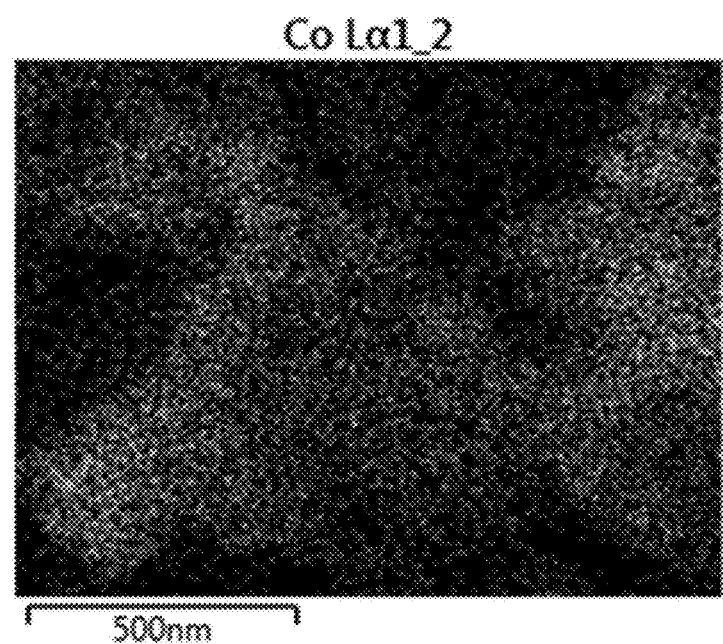
Figure 4D:
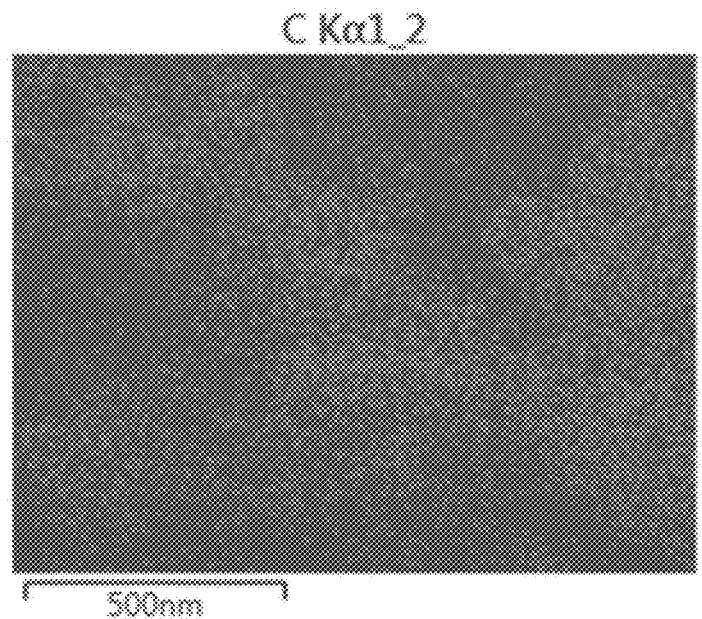

Referring to FIGS. 3 and 4, FIG. 3 shows blending metal powders obtained by dusting the composite powder of embodiment 6 of the present disclosure. As indicated in FIG. 3, the blending metal powder has a spherical shape. The blending metal powder and tungsten carbide powder are pressure grinded to obtain a composite powder of tungsten carbide/blending metal. According to the EDS elemental analysis (JEOL-6330 Field-Emission SEM) illustrated in FIGS. 4A-4D, the tungsten carbide powder and the blending metal powder are fully blended. The particles of the grinded composite powder of tungsten carbide/blending metal are illustrated in FIG. 4A. Elemental distribution analysis shows that the distributions of three elements, that is, tungsten (FIG. 4B), cobalt (FIG. 4C) and carbon (FIG. 4D), almost overlap one another. This indicates that tungsten carbide powder and the blending metal powder are fully blended.

The embodiments of the present disclosure can be used in a manufacturing process, such as an additive laser sintering process, a conventional carbide sintering process, a thermal spraying process and a laser surface coating process, for manufacturing a variety of knives, molds and workpieces with complicated shapes, high compactness and excellent manufacturing quality.

The additive laser sintering process provides quick heating and quick solidification. Therefore, when the additive laser sintering process is used for processing the composite powder of carbide/blending metal, the wettability between the blending metal and carbide must be high enough. In an embodiment of the present disclosure, for example, the blending metal material of tungsten carbide is selected for the blending metal with high wettability, which mainly composed of cobalt with the addition of metals of such as aluminum (Al), titanium (Ti), iron (Fe), and nickel (Ni) to form a uniform metal powder.

The wettability between the blending metal powder of the present disclosure and carbide, such as tungsten carbide, is increased, such that during the additive laser sintering process, the composite powder of tungsten carbide/blending metal can be quickly interposed between particles of tungsten carbide to avoid the formation of pores and increase the compactness of the sintered body. Moreover, the blending metal powder of the present disclosure does not contain paraffin and any inhibitors, which avoids the generation of brittle phase ($\eta$ phase). In the embodiments of the present disclosure, 1-3 wt % of iron, 1-3 wt % of nickel, 1-3 wt % of aluminum, and 1-3 wt % of titanium are respectively added to the blending metal with cobalt, so that the contact angle between the blending metal and tungsten carbide can be reduced, and the composite powder can be quickly interposed between particles of tungsten carbide.

After the additive laser sintering process is performed on the carbide of the present disclosure, such as a composite powder of tungsten carbide/blending metal, the hardness of the sintered body, as shown in Table 2, is equivalent to the hardness of the conventional sintering bulk. The carbide of the present disclosure can be used in related industries of knives and molds.

TABLE 2

| | Sintering Process | Types of Blending Metal Powder | Amount of Blending Metal (%) | Hardness (Hv) |
|---|---|---|---|---|
| Embodiment 16 | Additive Laser Sintering | Powder | 19 | 1481 ± 44 |

TABLE 2-continued

| | Sintering Process | Types of Blending Metal Powder | Amount of Blending Metal (%) | Hardness (Hv) |
|---|---|---|---|---|
| Comparative Example 1 | Additive Laser Sintering | Powder | 19 | 996 ± 18 |
| Comparative Example 2 | Conventional Sintering | Bulk | 19 | 1480 |

Embodiment 16

Figure 5:
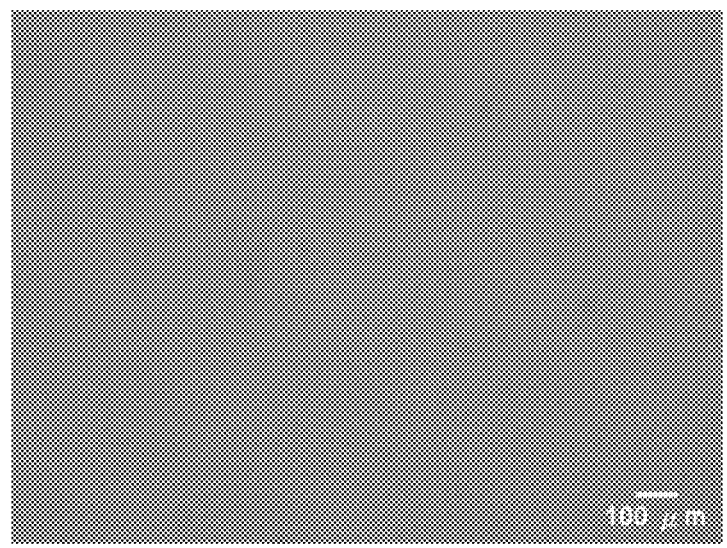
FIG. 5 is a metallographic analysis after an additive laser sintering process is performed on a composite powder of tungsten carbide/blending metal according to an embodiment of the present disclosure.

The additive laser sintering process is performed on the composite powder of embodiment 13 to obtain a sintered body. The result of metallographic analysis performed on the sintered body as illustrated in FIG. 5 shows that the sintered body is a compact structure. After the Vikers micro hardness testing is performed on the sintered body, the hardness of the sintered body measures 1481±44 Hv.

Comparative Example 1

After the commercially available composite powder of tungsten carbide/cobalt is pressure grinded, the additive laser sintering process is performed on the pressure grinded composite powder of tungsten carbide/cobalt. Then, hardness testing is performed on the sintered body, and the hardness measures 996±18 Hv.

Comparative Example 2

After hardness testing is performed on the sintering body of the commercially available metal bulk of tungsten carbide/cobalt (Kyoritsu Gokin Co., Ltd. of Japan, Model: EF20), the hardness measures 1480 Hv.

As indicated in Table 1, in the blending metal of the embodiments of the present disclosure, the amount of cobalt occupies 90-99% of the total blending metal, the amount of aluminum occupies 1-3% of the total blending metal, the amount of titanium occupies 1-3% of the total blending metal, the amount of iron occupies 1-3% of the total blending metal, and the amount of nickel occupies 1-3% of the total blending metal. Moreover, the blending metal does not contain any paraffin and inhibitors. Since the contact angle between the composite powder with small particle size and tungsten carbide is smaller (that is, better wettability) during the liquid-state sintering process, the composite powder can be quickly filled during the additive laser sintering process and can thus be used for processing workpieces with complicated shapes. Furthermore, the hardness of the sintered body obtained by using the additive laser sintering process is equivalent to the hardness obtained by using the conventional sintering process (as indicated in Table 2). Furthermore, the composite powder can be quickly filled, the usage of material can be reduced, and the material cost can be saved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A composite powder, comprising:
    80-97 wt % of carbide; and
    3-20 wt % of a blending metal powder comprising cobalt and a first metal powder, wherein the first metal powder is formed of nickel, or nickel, and one of aluminum, titanium, iron or a combination thereof, the amount of cobalt is 90-96% of the blending metal powder, and the ratio of the amount of cobalt to the amount of nickel is 30:1-96:1.

2. The composite powder according to claim 1, wherein the first metal powder comprises aluminum, titanium, iron, and nickel.

3. The composite powder according to claim 1, wherein the amount of aluminum occupies 1-3% of the blending metal powder.

4. The composite powder according to claim 1, wherein the amount of titanium occupies 1-3% of the blending metal powder.

5. The composite powder according to claim 1, wherein the amount of iron occupies 1-3% of the blending metal powder.

6. The composite powder according to claim 1, wherein the amount of nickel occupies 1-3% of the blending metal powder.

7. The composite powder according to claim 1, wherein the carbide is tungsten carbide or titanium carbide.

8. The composite powder according to claim 1, wherein the composite powder is used in an additive laser sintering process, a conventional carbide sintering process, a thermal spraying process, or a laser surface coating process.

9. The composite powder according to claim 2, wherein the carbide is tungsten carbide.

10. The composite powder according to claim 9, wherein the amount of aluminum occupies 1-3% of the blending metal powder.

11. The composite powder according to claim 9, wherein the amount of titanium occupies 1-3% of the blending metal powder.

12. The composite powder according to claim 9, wherein the amount of iron occupies 1-3% of the blending metal powder.

13. The composite powder according to claim 9, wherein the amount of nickel occupies 1-3% of the blending metal powder.

14. The composite powder according to claim 9, wherein the amount the amount of aluminum occupies 1-3% of the blending metal powder, the amount of titanium occupies 1-3% of the blending metal powder, the amount of iron occupies 1-3% of the blending metal powder, and the amount of nickel occupies 1-3% of the blending metal powder.

* * * * *